Feb. 7, 1956
J. P. BUTTERFIELD ET AL
2,733,572
COMPONENTS FOR CLOSED HYDRAULIC SYSTEM AND
THE LIKE AND METHOD OF MANUFACTURING SAME
Filed July 20, 1950
2 Sheets-Sheet 1
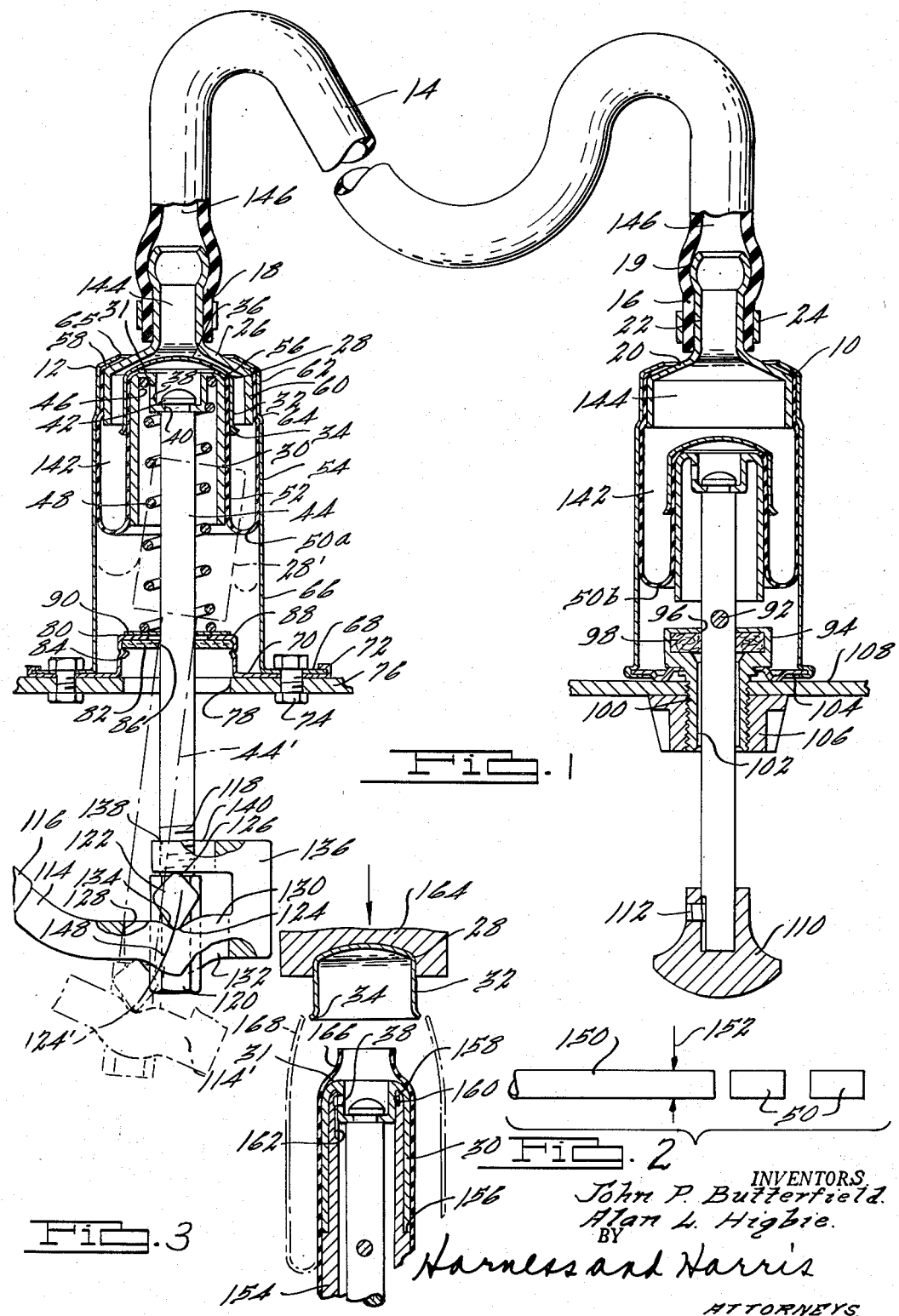
INVENTORS.
John P. Butterfield.
Alan L. Higbie.
BY
Harness and Harris
ATTORNEYS.

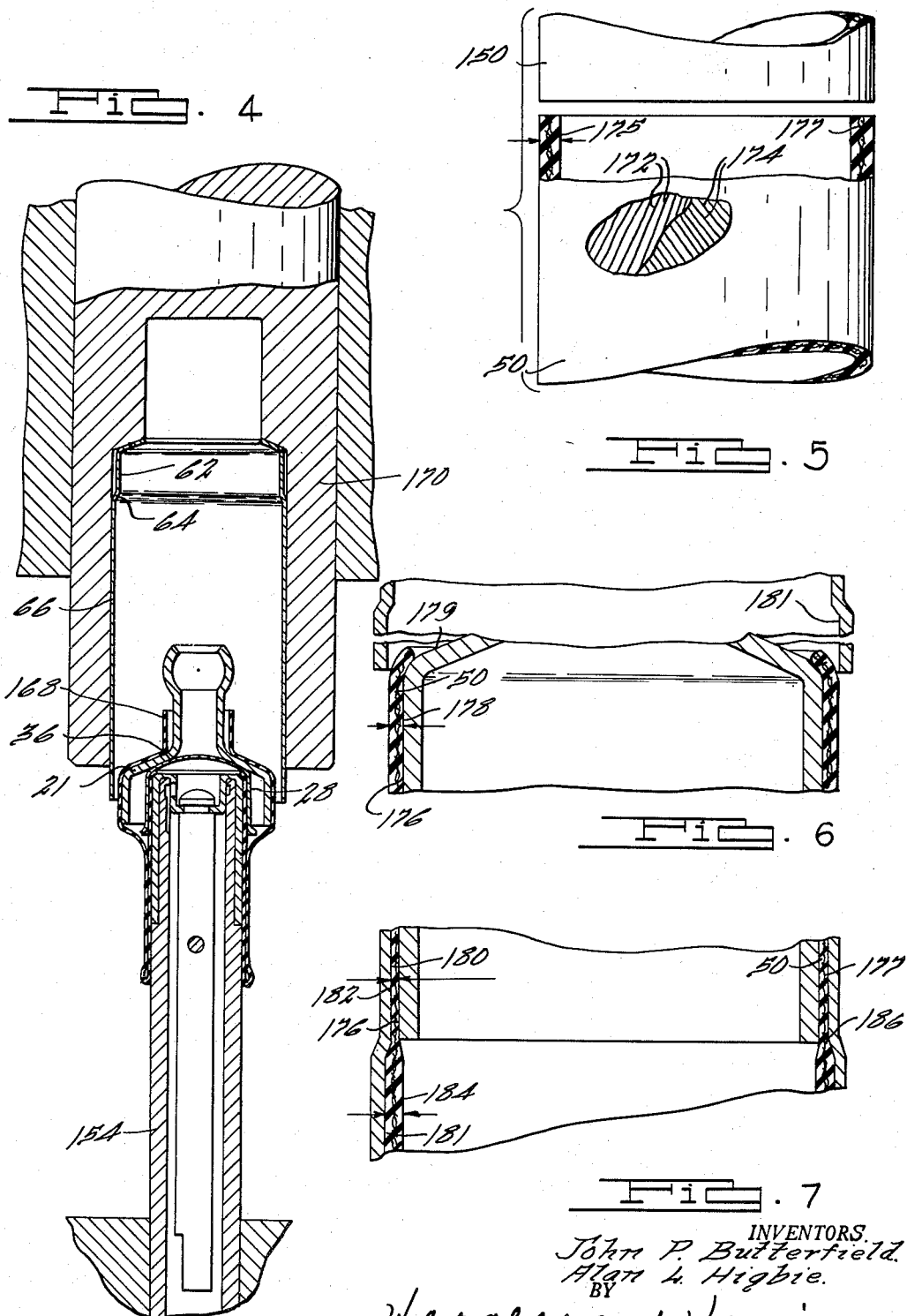

United States Patent Office 2,733,572
Patented Feb. 7, 1956

2,733,572

COMPONENTS FOR CLOSED HYDRAULIC SYSTEM AND THE LIKE AND METHOD OF MANUFACTURING SAME

John P. Butterfield, Grosse Pointe Woods, and Alan L. Higbie, Walled Lake, Mich., assignors to Chrysler Corporation, Highland Park, Mich., a corporation of Delaware Application July 20, 1950, Serial No. 174,976

16 Claims. (Cl. 60—54.5)

This invention relates to a hydraulic motion transmitting device and to a method for fabricating the same. More particularly, the invention includes master and slave capsules which are provided with fluid-tight rolling seals formed of sections cut from commercial flexible tubing, said seals not only eliminating such leakage as is attendant with sliding seals, but also are instantly arranged to provide for movement of the piston within the capsule in curvilinear and other curved paths in addition to the traditional rectilinear movement.

Stocking or rolling type seals are known in the art to comprise a flexible sleeve usually pronouncedly tapering in the fashion of a cone between integral ends which are conventionally thickened to include an annular metal grommet or other reinforcing beading. The sleeve, usually of rubber, is reinforced longitudinally by flexible cords or yarns and is folded longitudinally back on itself to have inner and outer parts movable relative to one another by a rolling action, in a manner such that rubber material is payed off around the joining fold from the inner to the outer parts in one direction of movement and vice versa in the other, as in the process of turning a stocking inside out. In the rolling fold of the sleeve the leakage problem seems to solve itself owing to the uninterrupted continuity of the rubber; by accepted thinking on the subject, the solution to the separate leakage problem arising in connection with attaching the respective ends of the sleeve lies in use of thickened, grommet reinforced ends such as noted, held in reentrant angled clamps against which the shoulder provided by the thickened rubber can abut in effective interengagement. According to a feature of the present invention, provision is made whereby sections of commercial cylindrical tubing may be successfully anchored at their unthickened, ungrommeted ends under uniform peripheral pressure, and made to serve as a seal for liquid from which the raw ends of the section and/or reinforcing yarns are posively separated.

According to a further feature, a reservoirless hydraulic motion transmission mechanism is provided which requires no re-charging or liquid replenishment in service, being permanently filled and sealed as released from manufacture.

According to still a further feature is the provision of an hydraulic capsule, permanently sealed, in which the piston rod has a seal permitting not only reciprocal movement of the rod normal to the plane of the guide bearing, but also oblique thereto. Hence the projecting end of the piston rod may transmit thrust to and from the actuated member with which it cooperates, along curvilinear, curved, rectilinear, and combination loci.

According to yet a further feature, a fabrication procedure is provided in which the components of the ultimate unit—a capsule—are assembled from inside out, so to speak, the inner parts once assembled serving to provide support for the outer parts, as during incorporation of the latter parts permanently into the unit.

According to another feature of the invention, provision is made to secure the ends of the seal between parallel cylindrical surfaces for the purpose of affording uniform pressure circumferentially and longitudinally of the secured ends; the longitudinal yarns which continue through the end portions of the seal thence may serve to prevent the rubber in the seal from necking down, as it were, to a thickness less locally than the spacing dimension between the parallel cylindrical walls and from progressively working out from between the same.

According to still another feature is the provision of forced or friction fits between parts, with the seal ends in effective interposition, thus making possible a highly suitable fluid tight joint without resort to bolts, jaw clamps, gaskets and the like conventional sealing expedients.

Further features, objects, and advantages will either be specifically pointed out or become apparent when for a better understanding of the invention, reference is made to the following written description taken in conjunction with the accompanying drawings wherein:

Figure 1 is a longitudinal section of the motion transmitting device of the present invention;

Figure 2 is a view of the production source of rolling seals used;

Figure 3 represents a step leading to incorporation of the seal into piston structure;

Figure 4 represents the step of incorporation of the cylinder structure over the piston and seal assembly; and Figures 5, 6, and 7 represent the sequential stages in securement of either end of the seal.

In particular regard to Figure 1 of the drawings, the hydraulic motion transmitting mechanism shown comprises master and slave units 10 and 12 connected through a permanently sealed conduit 14 which may be flexible rubber hose, a synthetic hose, copper or other metallic tubing, and the like. Of the end portions 16 and 18 of conduit 14, portion 16 is received over the enlarged end 19 of an end fitting 20 for the master unit having a neck 22. A fastening device 24 encircles the end portion 16 in the vicinity of neck 22 such as to form a fluid tight joint. End portion 18 of conduit 14 is similarly connected to an end fitting 26 for slave unit 12. Slave unit 12 assumes the form of a sealed capsule in which is received a loose fitting piston 28. The piston 28 is provided with a skirt member 30 having cylindrical depending walls and a shoulder 31 of reduced diameter relative to the cylindrical walls. Over skirt member 30 is adapted to be received a cap 32 having a flared rim 34 and a crown 36. Skirt member 30 of the piston is provided with an air escape hole 38 later to be described, and an opening 40 adjacent the center thereof in which is received the head, peened over as at 42, on the inner end of a piston rod 44. Skirt member 30 defines a domed recess 46 in which is received a resilient member 48 which may be a conventional coil spring of somewhat lesser diameter than the inner diameter of the skirt of the piston.

A rolling type seal 50ᵃ, folded longitudinally on itself to provide inner and outer walls 52 and 54, has the end of the inner portion received in the space between skirt 30 and the parallel overlying cap flange 32. The extreme end 56 of seal 50ᵃ may extend somewhat around shoulder 31 of skirt member 30 and in parallelism with the shoulder. Parallel cylindrical walls 30 and 32 subject the inner extremity of seal 50ᵃ to uniform simple compressive forces. The extreme end 58 of outer wall 54 may extend parallely around the converging shoulder of fitting 26 to a limited extent, depending in the opposite direction therefrom along the cylindrical depending skirt 60 of end fitting 26. The actual working cylinder member 66 has a cylindrical wall portion 62 disposed between a step 64 flaring outwardly in the working cylinder 66 and a flange portion 65 defining an opening which accommodates the neck and enlarged end of end fitting 26. It is to be noted that the outer wall end of seal 50ª is held between depending cylindrical flange 60 and parallel cylindrical wall portion 62 in simple direct radial compression. From step 64 to end flange 68 the working cylinder member 66 has generally cylindrical walls along which outer wall 54 of the seal 50ª lies. End flange 68 is held in the cylinder closing means 70 by an inturned lug portion 72.

Suitable fasteners as at 74 are provided for attaching the closing means and working cylinder flange to a supporting part such as 76. Supporting part 76 has an opening 78 formed therein to accommodate movement of piston rod 44. In the dome 80 provided by closing means 70 is provided a seal 82 for piston rod 44 suitably retained in place as by staking indicated at 84. Centrally of rod seal 82 is formed an opening 86 permitting sliding reception of the rod 44. Owing to the yieldable character of the material selected for rod seal 82, the opening 86 is also adapted to accommodate eccentric movement of the rod in the plane of seal 82 and in an oblique direction. A central transverse flange 88 formed on dome 80 is engaged by a washer 90 slidable transversely relative thereto. Washer 90 so fits piston rod 44 as to accommodate tilting movement of the rod by transversely sliding relative to flange 88.

Master unit 10 will be noted to differ somewhat from the slave unit 12 just described as regards details of the rod bearing structure. The seal 50ᵇ in unit 10 is attached at its ends similarly to the seal 50ª of unit 12. A piston rod stud 92, however, is provided in unit 10 for appropriate engagement with a cylinder closing means comprising a rod bearing member 94 having a central aperture 96 for reception of the rod. Received in an internal recess of member 94 is a combined guide bearing and seal 98. Member 94 has a threaded end portion 100 through the center of which is provided a rod receiving bore 102. End flange 104 of the cylinder closing means is secured to member 94 and the entire assemblage is firmly held to a supporting part 108 by means of a suitable fastener or nut 106. A piston rod handle or knob 110 is provided for the master unit 10 and held firmly in place by a set screw 112.

An actuated member 114 is provided for the slave unit 12 and has a pivot portion 116 provided for pivotally mounting the actuated member 114. Adapting piston rod 44 for cooperating with actuated member 114 is a threaded portion 118 formed on the outer end of piston rod 44 for the reception of an internally threaded part having a nut portion 120 and laterally extending portions such as lug 122. Lug 122 has a knife edge portion 124 and another opposed contact portion 126. Actuated member 114 is provided with an opening 128 accommodating the nut 120. On either side of opening 128 member 114 has transverse portions 130 and 132 each having a suitable depression or socket as at 134 for reception of the knife edge contact portion 124 on lug 122. Actuated member 114 is angled at 136 and terminates in bifurcated portions 138 and 140 lying to either side of piston rod 44. Contact portion 126 on lug 122 is adapted to engage one of the bifurcations 138 or 140.

In the chambers 142 defined by the seals, the chambers 144 defined by the end fittings, and in the chamber 146 provided by conduit 14, is received a body of suitable hydraulic liquid. Owing to the residual pressure maintained in the system when stop 92 of unit 10 engages, the walls 52 and 54 of the seal 50ª in unit 12 will tend to be urged radially against members 30 and 66 respectively, and to be held under enforced spacing owing to the pressure from the liquid. The unique feature of the fold of section 50ª between respective walls 52 and 54 thereof, is that though section 50ª flexes to accommodate relative movement of walls 52 and 54 out of general concentricity with one another when the piston 28 tilts, the fold at least in its own plane tends to center itself relative to the walls of working cylinder 66. Hence no further bearing or guide is needed for the piston rod so long as the end 118 is constrained to a predetermined path. It is contemplated that to charge the system both the master and slave units, with or without closing means 80 and 94 respectively, be submerged in hydraulic liquid and conduit 14 immersed therewith. Under such circumstances the system may be charged free of air and assembled and sealed while still immersed such that no air will be trapped in service therein and there will be no further occasion to replenish the fluid in the sealed system. It is to be observed that end fittings 20 and 26 are formed to assume a reverse flare upwardly with one purpose being in mind of providing ready exit for trapped air or other bubbles during assembly.

The operation of the device described in Figure 1 is as follows. As handle 110 on the master unit 10 is moved upwardly in Figure 1, piston travel upwardly causes the volume in chambers 142 and 144 to be decreased and hydraulic fluid accordingly to be displaced in conduit 14. It will be noted that there is no avenue of escape in unit 10 other than through end fitting 20. That is to say, the end portions of seal 50ᵇ are firmly held in compression uniformly about their periphery with the ends of seal 50ᵇ in which there may be raw yarn exposed, positively and completely separated from the hydraulic liquid. Hence there will be no occasion for any wicking action and ply separation to result. As the hydraulic fluid forces its way into chamber 144, the pressure exerted on the top of piston 28 will cause downward movement of the piston. Any downward movement of the piston of course, will be resisted by resilient means 48.

Inasmuch as actuated member 114 is pivotally mounted, knife edge 124 formed on lug 122 will be constrained to movement about a circular arc such as is indicated at 148. The piston rod, as previously pointed out, is effectively mounted for tilting movement relative to the plane of seal 82 and the inner end 42 of the piston rod and piston 28 will, since the fold between walls 52 and 54 tends under liquid pressure to center the system in its own plane, generally tend to follow a curved path somewhat similar to the path described by outer end 118. Sufficient movement of the rod 44 will cause the piston to assume a position 28' and also piston rod 44 to assume the new position 44'. The new rod position 44' will be noted to be oblique to the plane of the deformable seal 82, and eccentric therein to the axis of cylinder 66. When the manual pressure is released on handle 110 of master unit 10, the resilient member 48 will tend to move upwardly in order to restore the piston from its position shown at 28' to its original position. The terminology "master unit" and "slave unit" is applied to the capsules 10 and 12 purely for convenience in description. It will be readily appreciated that by merely interchanging the resilient member 48 and the stop 92 in their relative positions on the hydraulic units the capsule 12 can be simply converted into a master unit and the capsule 10 converted into a slave unit. That is to say, if from dotted line position 114' the actuated member is moved mechanically or manually in a counterclockwise path, the engaging knife edge portion 124' will be thrust upon and piston rod 44' will be caused to move upwardly and the piston accordingly caused to move upwardly from the dotted line position 28' shown.

In the position shown in Figure 1 it will be noted that inner wall 52 and outer wall 54 of seal 50ª are concentric not only with the piston, but also with the working cylinder 66. Since seal 50ª is of flexible material, however, the inner wall 52 may move freely with piston 28 into a position as at 28' out of general concentricity with the outer wall 54 and the working cylinder 66

With particular regard to Figure 2 tubing stock 150 is shown which may be of an ordinarily commercial variety susceptive of continual production. The severing means or shears diagrammatically indicated at 152 act on the end of tubing stock 150 to reduce the tubing into sections 50, each of which is suitable as a rolling seal in devices of the character of Figure 1.

In Figures 3 and 4 there are shown steps in the progressive assembly of a capsule such as discussed in the foregoing. In Figure 3 a fixture 154 is provided for suitable reception within skirt member 30 for the piston. A shoulder 156 forms a rest for skirt member 30. The end of fixture 154 is formed as at 158 to be received in the domed recess of the piston skirt member 30. A circumferential groove 160 is formed in the end portion 158 and has an air escape passage 162 in communication therewith. The air escape opening 38 in skirt member 30 is adapted to register with annular groove 160 in order to permit trapped air to escape therefrom during the downward movement of cap 28 upon the piston. Cap 28 presenting the cylindrical depending walls 32 is suitably held in a fixture 164 movable axially toward the fixture 154. The seal is stretched over the depending cylindrical walls 30 of the piston skirt member such as to leave an unstretched portion 166 of the seal extending axially around shoulder 31 of skirt member 30 and off the end of skirt member 30. The non-parallel step provided by the flare 34 in the rim of cap 28 serves to engage the portion 166 of the seal and shoulder 31 of skirt member 30 and slide over shoulder 31 by means of a wedging action. Due to the close friction fit involved, portion 166 of the seal tends to slide around shoulder 31 and move in coordinated motion with cap 28. Such companion motion is made possible owing to the fact that portion 166 is not thickened and hence will have no tendency to roll up or ball as cap 28 is shoved downwardly into final place. As the cylindrical walls 32 are forced over the seal and skirt member 30, said walls yield outwardly somewhat and are retained on the skirt member 30 owing to the hoop tension stressed into cylindrical walls 32. As a result, the seal member portion 166 is placed in direct radial compression between the opposed cylindrical walls and owing to its movement with cap 28 is forced downwardly along skirt member 30 into the position of Figure 4.

As respects Figure 4 the crown 36 of cap 28 serves as the end fitting support member being in turn supported by fixture 154. The free end 168 of the seal shown in Figure 3 is stretched outwardly in Figure 4 over the shoulder 21 provided on the end fitting to extend in relaxed state generally past the shoulder as at 168 in Figure 4. The cup 66 which provides the cylindrical working walls of the working cylinder is suitably held in a fixture 170 so as to present the downwardly flared step 64 to the fixture 154 of the piston. As the working cylinder member 66 is brought downwardly toward the fixture 154 the non-parallel step 64 serves to engage the portion of seal 168 over the shoulder 21 on the end fitting. Inasmuch as there is no thickened portion to end portion 168, end portion 168 slides with the cup 66 downwardly over the shoulder 21 of the end fitting and downwardly along the end fitting. The cylindrical wall portion 62 may expand somewhat under hoop tension to hold the end of the seal in simple direct radial compression as discussed in connection with the devices of Figure 1.

Figures 5, 6, and 7 bring out, on a greatly exaggerated basis, the sequential changes in seals such as the seal sections 50 in Figure 2, as they are to be ultimately subjected to the simple direct compression of opposed cylindrical surfaces. The tubing stock 50 is as shown in Figure 5 divided into individual sections of a predetermined length as at 50. In relaxed state the walls of the tube sections 50 may assume a dimension of thinness as illustrated at 175. The reinforcing fabric or yarns which may be disposed in layers such as at 172 and 174 along the walls of the tube section 50, extend generally longitudinally of the tube section and into the end portion in the vicinity of reference character 177.

In Figure 6 it will be seen that as the tube section 50 is stretched over cylindrical walls such as at 176 from around the shoulder surface 179, the wall section decreases somewhat, as is indicated at 178, from the thinness shown in Figure 5. The stepped cylindrical surface 181 is shown immediately previous to its engagement with tube section 50.

In Figure 7 is shown the tubing section 50 after being compressed between the outer cylindrical surface 180 and the inner cylindrical surface 176. The thinness dimension will be noted to be reduced from the thinness represented at 178 in Figure 6 and also relative to the thinness dimension shown at 184 in Figure 7. The yarns 177 in tubing section 50 will be noted to extend in the spaced region between the cylindrical surfaces just set forth. There will, owing to the resistance to tensile strain of the yarns, accordingly be little or no tendency for the rubber in tubing section 50 to neck down locally and progressively be withdrawn from the spaces between the cylindrical surfaces aforesaid. Preferably the member presenting the outer cylindrical surface 180 is adapted to yield in hoop tension and hence the tubing section 50 has no tendency to wrinkle or otherwise change from a purely cylindrical shape. The section 50 thereafter acts in shear to prevent axial separation between the inner and outer cylindrical surfaces. By virtue of the uniform pressure both circumferentially and axially of tubing section 50, a positive seal is provided in which no thickened portions for the seal are necessary or reentrant angles interengaging with these thickened portions as may be afforded by clamps or other opposed interengaging walls.

Variations within the spirit and scope of the above described invention are equally comprehended by the foregoing description.

We claim:

1. In a multi-part hydraulic cylinder having a pressure actuated multi-part piston loosely movable therewithin along curved as well as rectilinear paths, a section of flexible tubing received in the cylinder and folded longitudinally on itself to form spaced inner and outer walls substantially concentric with one another and with the cylinder, said cylinder and said piston each having a bipartite end portion, each of the respective end portions retainably securing one of the wall-ends of the tubing section in simple radial compression, a piston rod for the piston, and means mounted to an end of the cylinder slidably receiving the piston rod in a manner to permit rod travel obliquely through the plane thereof facilitating piston movement in curvilinear paths in the cylinder, the flexible tubing section being adapted to flex and accommodate corresponding curvilinear path movement with the piston, of the inner wall out of concentricity with the outer wall and cylinder.

2. In combination, a cylinder having an unobstructed smooth bore, a piston having a substantially smooth cylindrical skirt and a cap overlying the piston skirt adjacent one end of the piston, said cap having an integral flange circumferentially disposed around the piston skirt and in closely spaced adjacency with respect thereto in a radial direction, a normally cylindrical tube of flexible material incorporating therein reinforcing elements disposed between and extending from one extremity of the tube to the other, said flexible material defining a tube wall of normally uniform thickness in which said elements are embedded and being foldable upon itself to provide inner and outer concentric walls positionable between the cylinder bore and piston skirt, said inner wall of the tube having the portion thereof at one tube end sealingly disposed in the space between the cylindrical piston skirt and circumferential cap flange and compressed thereby to a thinner dimension than said normal uniform thickness and in a manner for frictionally engaging said smooth cylindrical skirt and acting in shear to prevent separation of the cap flange therefrom, and a cylinder head part having a flange received in said one end of the cylinder and defining therewith a space inside the smooth bore of the latter, said outer wall of the tube having the portion thereof at the other tube end so received in the just-named bore space as to be compressed to a thinner dimension than said normal uniform thickness and frictionally to engage said smooth bore and act in shear to prevent separation of the cylinder head from the cylinder, said cap, concentric walls, and cylinder head part presenting a continuous liquid-impervious surface effective between the pressure chamber defined by piston and cylinder and the reinforcing elements exposed at the tube extremities.

3. In combination, a cylinder having an unobstructed smooth bore, a piston having a substantially smooth cylindrical skirt and a cap overlying the piston skirt adjacent one end of the piston, said cap having an integral flange circumferentially disposed around the piston skirt and in closely spaced adjacency with respect thereto in a radial direction, a normally cylindrical tube of flexible material having a wall of normally uniform thickness and being foldable upon itself to provide inner and outer concentric walls positionable between the cylinder bore and piston skirt, said inner wall of the tube having the portion thereof at one tube end sealingly disposed in the space between the cylindrical piston skirt and circumferential cap flange and compressed thereby to a thinner dimension than said normal uniform thickness and in a manner for frictionally engaging said smooth cylindrical skirt and acting in shear to prevent separation of the cap flange therefrom, and a cylinder head part having a flange received in said one end of the cylinder and defining therewith a space inside the smooth bore of the latter, said outer wall of the tube having the portion thereof at the other tube end so received in the just-named bore space as to be compressed to a thinner dimension than said normal uniform thickness and frictionally to engage said smooth bore and act in shear to prevent separation of the cylinder head from the cylinder.

4. The method of making a capsule for an hydraulic system which includes applying a section of thin rubber-like tubing over a piston having cylindrical walls and being held in a fixture, forcing thereover a member having complementary cylindrical walls resiliently expansible circumferentially around an end portion of the tubing and piston, providing a cylindrically walled end fitting loosely received on said member and supported by the piston so as to expose cylindrical walls in radial spacing to the aforesaid cylindrical walls, inverting the tubing over the piston and cylindrical walls of the fitting by turning the same inside out such that a circumferentially rolling fold is formed in the tubing and the formerly opposite end thereof is radially spaced to the first said tubing end, and telescoping over the said opposite end and piston-supported fitting a substantially cylindrical member having companion cylindrical walls to the walls of the fitting expansible circumferentially around the said opposite end and fitting.

5. In the method of making an hydraulic capsule, the steps which include providing a supported member having cylindrical outer walls reduced at one end thereof to provide a shoulder, providing a circumferentially flexible tube member of uniform wall thickness throughout its entire length having a lesser diameter than said cylindrical walls and relatively greater length, stretching the tube member over the shoulder end of the supported member and advancing the members into such telescoped relation that first and second end portions of the tube member extend respectively beyond the shoulder end and other end of the supported member, and forcing a cap member having predeterminedly cylindrical depending walls over the shoulder end of the supported member causing the first end portion of the tube member to stretch and move with the cap member into a further advanced position in the direction of the supported member, the said members mutually contributing to form a piston wherein a substantial part of the said first end portion is in radial compression between the respective cylindrical walls aforesaid with the first end portion being effective in shear to prevent relative movement therebetween and with the extreme end of the first end portion terminating on the shoulder in parallelism therewith.

6. In the method of making an hydraulic capsule, the steps which include providing a supported member having cylindrical outer walls reduced at one end thereof to provide a shoulder, providing a circumferentially flexible tube member of uniform wall thickness throughout its entire length having a lesser diameter than said cylindrical walls and relatively greater length, stretching the tube member over the supported member and advancing the members into such telescoped relation that first and second end portions of the tube member extend respectively beyond the shoulder end and other end of the supported member, and forcing a cup member having predeterminedly cylindrical depending walls over the shoulder end of the supported member causing the first end portion of the tube member to stretch and move with the cup member into a further advanced position in the direction of the supported member, the said members mutually contributing to form a cylinder wherein a substantial part of the said first end portion is in radial compression between the respective cylindrical walls aforesaid with the first end portion being effective in shear to prevent relative movement therebetween and with the extreme end of the first end portion terminating on the shoulder in parallelism therewith.

7. In the method of making an hydraulic capsule, the steps which include providing a supported member having cylindrical outer walls reduced at one end thereof to provide a shoulder, providing a circumferentially flexible tube member of uniform wall thickness throughout its entire length having a lesser diameter than said cylindrical walls and relatively greater length, stretching the tube member over the shoulder end of the supported member and advancing the members into such telescoped relation that first and second end portions of the tube member extend respectively beyond the shoulder end and other end of the supported member, forcing a cap member having predeterminedly cylindrical depending walls, over the shoulder end of the supported member causing the first end portion of the tube member to stretch and move with the cap member into a further advanced position in the direction of the supported member, the said members mutually contributing to form a piston wherein a substantial part of the said first end portion is in radial compression between the respective cylindrical walls aforesaid with the first end portion being effective in shear to prevent relative movement therebetween and with the extreme end of the first end portion terminating on the shoulder in parallelism therewith, supporting a fitting-like part on the piston having cylindrical outer walls depending in spaced relation to the piston and a shouder of reduced diameter relative to the said depending walls at the region of the part from which the walls depend, folding the tube member back on itself in an inside out direction and stretching the second end portion thereof over the depending walls of the fitting-like part and advancing the said member and part into such telescoped relation that the second end portion extends over the shoulder of the part substantially beyond the region of the depending cylindrical walls, and forcing a cup-like part having predeterminedly cylindrical depending walls, over the shoulder region of the fitting-like part in the direction of the depending walls causing the second end portion of the tube member to stretch and move with the cup-like part into less extended position relative to the shoulder of the part, the said parts and tube member contributing to form a working cylinder for the piston wherein a substantial portion of the said second end portion is in radial compression between the respective cylindrical walls of said parts with the second end portion of the tube member being effective in shear to prevent relative movement therebetween and with the extreme end of the second end portion terminating on the fitting-like part shoulder in parallelism therewith.

8. An hydraulic capsule comprising the combination of a piston and a working cylinder therefor, said piston having an inner member provided with cylindrical outer walls reduced at one end thereof to provide a shoulder, and a cap member over the shoulder and said one end of the inner member having predeterminedly cylindrical depending walls spacedly opposing the cylindrical outer walls aforesaid, said working cylinder having an inner part provided with cylindrical outer walls of greater relative diameter than said piston, said inner part being open at one end thereof for reception of the cap end of the piston within the said cylindrical outer walls and having a shoulder of reduced diameter relative to said cylindrical outer walls at the end of the latter in spaced relation with respect to said open end of the said inner part, and a cup-like part over the shoulder and cylindrical outer walls of the inner part having predeterminedly cylindrical depending walls spacedly opposing the cylindrical outer walls of the inner part, a section of tube having circumferentially flexible end portions of uniform wall thickness with respect to the midportion thereof, said section of tube being folded back on itself to form inner and outer generally concentric walls extending in a common direction to a common fold from the respective said end portions thereof, the end portions of the tube section having a lesser free diameter than either set of the cylindrical outer walls aforesaid and being each circumferentially stretched around a different set of the respective cylindrical outer walls, one said end portion being compressed in the space between said opposed parts and the other said end portion being compressed in the space between said opposed members and being there retained under substantially uniform radial pressure as exerted by the opposed walls thereof.

9. In an hydraulic capsule, a working cylinder having parallel and non-parallel wall portions in the walls thereof forming an axial recess presenting a convergingly open end, a piston loosely fitting in the working cylinder, a piston rod projecting into the working cylinder connected to the piston, said piston having parallel and non-parallel wall portions in the walls thereof forming an axial recess presenting a convergingly open end, a section of flexible tubing folded back on itself to form substantially concentric inner and outer walls, said inner and outer walls of the tubing section having ends extending through the said convergingly open ends and into the axial recesses of the piston and cylinder respectively and secured thereto in simple frictional engagement with the parallel wall portions thereof, and means closing the working cylinder through which the piston rod passes and providing a sliding fit, said closing means and flexible tubing section cooperating to permit reciprocal movement of the piston and rod out of coincidence with the axis of the working cylinder and generally in eccentric relation thereto in the plane of the closing means.

10. In an hydraulic capsule, an axially extending working cylinder having parallel and non-parallel wall portions in the walls thereof forming an axial recess presenting a convergingly open end, a piston loosely fitting in the working cylinder, a piston rod projecting into the working cylinder connected to the piston, said piston having parallel and non-parallel wall portions in the walls thereof forming an axial recess presenting a convergingly open end, a section of flexible tubing folded back on itself to form substantially concentric inner and outer walls, said inner and outer walls of the tubing section having ends extending through the said convergingly open ends and into the axial recesses of the piston and cylinder respectively and being in engagement with the parallel wall portions thereof, and means closing the working cylinder through which the piston rod passes and providing a sliding fit arranged for tilting motion, said closing means and flexible tubing section cooperating to permit movement of the piston and rod out of coincidence with the axis of the working cylinder and generally eccentrically to the point of intersection of the same with the plane of the closing means as a center.

11. In an hydraulic capsule, a working cylinder having an axially extending circumferential recess presenting a convergingly open end, a piston loosely fitting in the working cylinder, a piston rod projecting into the working cylinder connected to the piston, said piston having an axially extending circumferential recess presenting a convergingly open end, a section of flexible tubing folded back on itself to form substantially concentric inner and outer walls, said inner and outer walls of the tubing section having ends extending through the said convergingly open ends and fitting into the axial recesses of the piston and cylinder respectively in simple compression free of reentrant angled interengagement therewith, and sealing means through which the piston rod reciprocates mounted to the cylinder and providing a sliding fit with the rod, said sealing means and flexible tubing section cooperating to permit reciprocal movement of the piston and rod out of coincidence with the axis of the working cylinder and in a path generally deviating eccentrically to the point of intersection of the said axis and plane of the closing means.

12. In an hydraulic device having a cylinder member and a pressure actuated piston member loosely movable therewithin along curved as well as rectilinear paths, a section of flexible tubing received in the cylinder and folded longitudinally on itself to form spaced inner and outer walls substantially concentric with one another and with the cylinder, said cylinder and piston members having end structures each defining a recess conforming to an axially extending path of revolution of relatively close dimensions for tightly retaining an extremity of the tubing therein, the respective recesses retainably receiving the corresponding wall-ends of the tubing section in simple radial compression, a piston rod for the piston, and means mounted to an end of the cylinder slidably receiving the piston rod in a manner to permit piston rod travel obliquely through the plane thereof facilitating piston movement in curvilinear paths in the cylinder, the flexible tubing section being adapted to flex and accommodate corresponding curvilinear path movement with the piston, of the inner wall out of concentricity with the outer wall and cylinder.

13. In a sealed capsule having a containing cylinder for pressure fluid and a headed piston loosely fitting and movable therewithin along curved as well as rectilinear paths, said piston being arranged to present the head thereof to the pressure fluid and having a depending skirt defining a recess, a section of flexible tubing so folded longitudinally on itself as to have the free ends thereof in relative adjacency and forming spaced inner and outer walls connected by the resulting fold, said tubing section being received in the cylinder between the latter and the piston and having means associated therewith sealingly securing the respective ends thereof to the cylinder and to the piston adjacent the piston head, the aforesaid spaced outer and inner walls lying along the cylinder and piston skirt respectively and being adapted to transfer from one to the other across said space by effective rolling movement around the fold upon relative motion between piston and cylinder, a piston rod projecting into the piston recess into an inner-ended attachment with the piston, and means closing the cylinder through which the piston rod passes and by which is provided a seal permitting reciprocal movement of the rod to positions oblique to the plane of the closing means, the outer end of the piston rod being connected for movement in a curved path such as to cause the corresponding movement of the piston-attached inner end of the rod on the opposite side of the tubing section fold to conform to a curved path, said tubing section flexing to permit appropriate changes in the spacing of said outer and inner walls accommodative of piston motion within the cylinder along a curved path.

14. In a sealed capsule having a containing cylinder for incompressible fluid and a headed piston loosely fitting and movable therewithin along curved as well as rectilinear paths, said piston being arranged to present the head thereof to pressure actuation from the incompressible fluid and having a depending skirt defining a recess, a section of flexible tubing so folded longitudinally on itself as to have the free ends thereof in relative adjacency and forming spaced inner and outer walls connected by the resulting fold, said tubing section being received in the cylinder between the latter and the piston and having means associated therewith sealingly securing the respective ends thereof to the cylinder and to the piston adjacent the piston head, the aforesaid spaced outer and inner walls lying along the cylinder and piston skirt respectively and being adapted to transfer from one to the other across said space by effective rolling movement around the fold upon relative motion between piston and cylinder, a piston rod projecting into the piston recess into an inner-ended attachment with the piston, means closing the cylinder through which the piston rod passes and by which is provided a seal permitting reciprocal movement of the rod to positions oblique to the plane of the closing means, and resilient means received in the piston recess acting between the piston and the closing means to oppose the incompressible fluid force on the head of the piston, the outer end of the piston rod being connected for movement in a curved path such as to cause the corresponding movement of the piston-attached inner end of the rod on the opposite side of the tubing section fold to conform to a curved path, said tubing section and resilient means flexing to permit appropriate changes in the spacing of said outer and inner walls accommodative of piston motion within the cylinder along a curved path.

15. In the method of making a capsule for an hydraulic system, the steps which include providing an air escape opening in the head of a headed piston member having a skirt comprised of cylindrical depending walls, providing a section of thin rubber-like tubing and at least partially advancing the same over the head and cylindrical depending walls of the piston member, providing a cover member having a complementary cylindrical depending flange which is circumferentially expansible, fitting the members in a proximate relation for the depending flange of the cover member to oppose the tubing section adjacent the head of the piston member, rapidly relatively moving the members in a direction so as to produce overlap and expand the cover member under the impact causing the thin tubing section to stretch and move with the cover member into a more advanced position and forcing the members into telescoped relation causing the trapped air therebetween to be expelled from the air escape opening.

16. In an hydraulic capsule, a headed piston member having cylindrical depending walls forming a skirt and means forming an opening in the head of the piston, a section of thin walled rubber tubing having a first end stretched over the skirt of the piston member and around the head thereof and a second end turned inside out so as to cause the tubing section to be folded back on itself to provide relatively inner and outer walls corresponding to the first and second ends respectively, and a cover member having a complementary cylindrical depending flange yieldably expanded around a substantial portion of the first end of the tubing section and disposed about the head of the piston member preventing communication through said head opening between the interior of the piston member and the space between the walls of the tubing section, said second end being secured to portions of said capsule which is radially spaced from said depending walls.

References Cited in the file of this patent

UNITED STATES PATENTS

| | | |
|---|---|---|
| 1,648,436 | Allen | Nov. 8, 1927 |
| 1,780,200 | Linderman | Nov. 4, 1930 |
| 1,793,454 | Bengtson | Feb. 24, 1931 |
| 2,036,536 | Ormsby | Apr. 7, 1936 |
| 2,110,783 | Welker | Mar. 8, 1938 |
| 2,126,661 | Provinson | Aug. 9, 1938 |
| 2,228,018 | Scholtes | Jan. 7, 1941 |
| 2,338,666 | Nelson | Jan. 4, 1944 |
| 2,392,173 | Mercier | Jan. 1, 1946 |
| 2,427,685 | Midtlyng et al. | Sept. 23, 1947 |
| 2,430,921 | Edelmann | Nov. 18, 1947 |
| 2,500,502 | Vogel | Mar. 14, 1950 |

FOREIGN PATENTS

| | | |
|---|---|---|
| 405,073 | Great Britain | Feb. 1, 1934 |